US010382569B2

(12) United States Patent
Pei et al.

(10) Patent No.: US 10,382,569 B2
(45) Date of Patent: Aug. 13, 2019

(54) LOCAL POSITIONING WITH COMMUNICATION TAGS

(71) Applicant: The Boeing Company, Chicago, IL (US)

(72) Inventors: Guangyu Pei, Issaquah, WA (US); David Kirkland, Normandy Park, WA (US); Ethan Carl Owyang, Bothell, WA (US); Shawn Robert LaGrotta, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/250,733

(22) Filed: Aug. 29, 2016

(65) Prior Publication Data

US 2018/0063260 A1 Mar. 1, 2018

(51) Int. Cl.
*H04L 29/08* (2006.01)
*G06K 7/10* (2006.01)
*B64D 11/00* (2006.01)
*G01S 1/68* (2006.01)
*G01S 13/76* (2006.01)
(Continued)

(52) U.S. Cl.
CPC .......... *H04L 67/18* (2013.01); *B64D 11/0015* (2013.01); *G01S 1/68* (2013.01); *G01S 13/765* (2013.01); *G06K 7/10128* (2013.01); *G06K 7/10366* (2013.01); *H04W 4/02* (2013.01); *H04W 4/42* (2018.02)

(58) Field of Classification Search
CPC . H04L 67/18; G06K 7/10128; G06K 7/10366
See application file for complete search history.

(56) References Cited

U.S. PATENT DOCUMENTS 8,064,120 B2 11/2011 Callahan et al.
8,605,917 B2 12/2013 Bleacher et al.
(Continued)

FOREIGN PATENT DOCUMENTS

WO 2016075611 A1 5/2016

OTHER PUBLICATIONS

Punya Prakash, "Data concentrators: The core of energy and data management." Texas Instruments White Paper, Sep. 2013, 7 pages.
(Continued)

*Primary Examiner* — Curtis B Odom
(74) *Attorney, Agent, or Firm* — Kolisch Hartwell, P.C.

(57) ABSTRACT

A local positioning system may include a reader assembly and a data processing assembly. The reader assembly may be configured to read tag data from at least one wireless communication tag of a plurality of wireless communication tags disposed in spaced-apart fixed positions relative to a structure extending along an expanse when the reader assembly is disposed in the expanse proximate to the at least one wireless communication tag. The reader assembly may also generate a communication-tag signal representative of the read tag data. A data processing assembly may be configured to access a mapping of the plurality of wireless communication tags relative to the structure. The data processing assembly may be further configured to determine a location of the reader assembly based on the read tag data and the mapping of the plurality of wireless communication tags relative to the structure.

17 Claims, 6 Drawing Sheets

Fig. 1

(51) Int. Cl.
*H04W 4/02* (2018.01)
*H04W 4/42* (2018.01)

(56) References Cited

U.S. PATENT DOCUMENTS

| | | |
|---|---|---|
| 9,380,428 B1 | 6/2016 | Dame et al. |
| 2006/0032979 A1 | 2/2006 | Mitchell et al. |
| 2010/0060050 A1 | 3/2010 | Muirhead |
| 2011/0018686 A1 | 1/2011 | Fahley et al. |
| 2012/0174165 A1 | 7/2012 | Mondragon et al. |
| 2014/0233959 A1 | 8/2014 | Ibrahim et al. |
| 2014/0242910 A1 | 8/2014 | Umlauft et al. |
| 2015/0363616 A1* | 12/2015 | Kumar ............... G06K 7/10366 340/8.1 |
| 2016/0370454 A1* | 12/2016 | Raynesford ............. G01S 5/021 |

OTHER PUBLICATIONS

European Patent Office, Extended European Search Report regarding European Patent Application No. 17187972.9, dated Feb. 2, 2018, 9 pages.

\* cited by examiner

LOCAL POSITIONING WITH COMMUNICATION TAGS

FIELD

This disclosure relates to local positioning systems of a structure extending along an expanse. More specifically, disclosed embodiments relate to systems and methods for providing passenger services within a vehicle.

INTRODUCTION

In-flight entertainment systems (IFESs) refers to systems in aircraft that make entertainment and personal service features available to aircraft passengers during a flight. For example, an IFES can provide audio channels for use with a passenger headset, video presentations, data connectivity, and personal services, such as reading light and attendant call light controls. A passenger control unit (PCU) is an IFES component located at each passenger seat that allows a passenger to input a request, such as a request to turn a reading light on or off, or change an audio or video channel. The IFES is a wired system that communicates over a data network with a Cabin Service System (CSS) for providing features requested by passengers. For example, the IFES might send a reading light command to the CSS and the CSS turns the light on.

Thus, IFESs support or provide passenger services functions, data communication between a PCU and the CSS backend, and a mapping between physical location of each seat (e.g. seat 32A) and an associated network (logical) address. The IFES uses the topology of the wired data network to associate logical addresses with PCUs and the associated passenger seat.

SUMMARY

The present disclosure includes a description of local positioning systems and related components associated with a structure. In some embodiments, a local positioning system includes a reader assembly configured to read tag data from at least one wireless communication tag of a plurality of wireless communication tags disposed in spaced-apart fixed positions relative to a structure extending along an expanse with the reader assembly disposed proximate to the at least one wireless communication tag. The reader assembly is further configured to generate a communication-tag signal representative of the read tag data. A data processing assembly is configured to access a mapping of the plurality of wireless communication tags with locations of the plurality of wireless communication tags. The data processing assembly is further configured to determine a location of the reader assembly based on the read tag data and the mapping of the plurality of wireless communication tags with locations of the plurality of wireless communication tags.

In some embodiments, a method comprises reading tag data from at least one wireless communication tag of a plurality of wireless communication tags disposed in spaced-apart fixed positions relative to a structure extending along an expanse with a reader assembly disposed proximate the at least one wireless communication tag. The method further includes generating a communication-tag signal representative of the read tag data. The method also includes accessing a mapping of the plurality of wireless communication tags with locations of the plurality of wireless communication tags, and determining a location of the reader assembly based on the read tag data and the mapping of the plurality of wireless communication tags with locations of the plurality of wireless communication tags.

The present disclosure also includes a description of passenger service systems and related components of a vehicle. In some embodiments, a passenger service system includes a passenger-request assembly configured to read tag data from at least one wireless communication tag of a plurality of wireless communication tags disposed in spaced-apart fixed positions within a vehicle. The at least one wireless communication tag is disposed proximate to a seat in the vehicle. The passenger-request assembly is further configured to generate a communication-tag signal representative of the read tag data and a passenger-request signal representative of a passenger-service request input by a passenger seated in the seat. The passenger-request assembly transmits wirelessly the communication-tag signal and the passenger-request signal. The passenger service system further includes a server assembly configured to wirelessly receive the transmitted communication-tag signal and passenger-request signal and determine a seat location of the first seat based on the passenger-service request and the read tag data.

In some embodiments, a method comprises reading tag data from at least one wireless communication tag disposed proximate to the first seat of an array of wireless communication tags disposed in spaced-apart fixed positions within the vehicle, generating by a passenger-request assembly a communication-tag signal representative of the read tag data, and transmitting wirelessly the communication-tag signal by the passenger-request assembly. The method further includes generating by the passenger-request assembly a passenger-request signal representative of the received passenger-service request, and transmitting wirelessly the passenger-request signal by the passenger-request assembly. The method further includes receiving wirelessly by a server assembly the transmitted communication-tag signal and passenger-request signal, and determining a seat location of the first seat based at least in part on the received communication-tag signal and passenger-request signal.

In some embodiments, an aircraft comprises a passenger cabin, a plurality of wireless communication tags, and a passenger service system. The passenger cabin has a plurality of groups of associated passenger seats distributed in the passenger cabin. A first group of associated passenger seats of the plurality of groups of associated passenger seats includes at least a first passenger seat. The plurality of wireless communication tags are disposed in spaced-apart fixed positions within the passenger cabin. The passenger service system includes a passenger-request unit and a wireless communication tag reader operatively coupled to the passenger-request unit. The wireless communication tag reader is disposed proximate to the first group of associated passenger seats and configured to read one or more of the wireless communication tags proximate to the wireless communication tag reader. The passenger-request unit is configured to generate a communication-tag signal representative of the read tag data and a passenger-request signal representative of a passenger-service request input by a passenger seated in the first passenger seat. The passenger-request unit is configured to transmit wirelessly the communication-tag signal and the passenger-request signal. The passenger service system further includes a server assembly configured to wirelessly receive the transmitted communication-tag signal and passenger-request signal and determine a seat location in the passenger cabin of the first seat based on the passenger-service request and the read tag data.

Features, functions, and advantages may be achieved independently in various embodiments of a passenger service system and the associated vehicle, or may be combined in yet other embodiments, further details of which can be seen with reference to the following description and drawings.

DESCRIPTION

Overview

Figure 1:
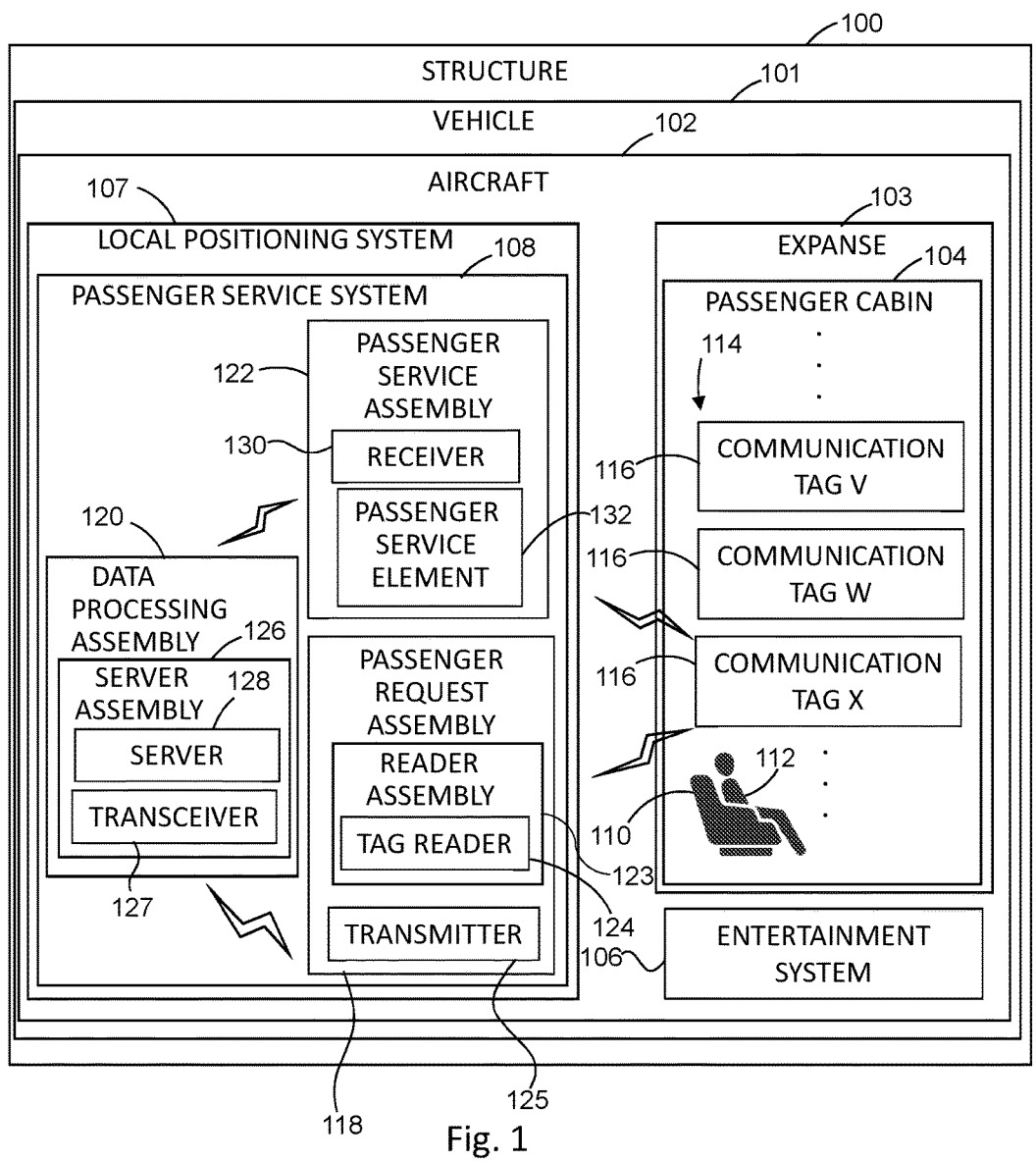
FIG. 1 is a block diagram illustrating an embodiment of a vehicle having a local positioning system including a passenger service system.

Various embodiments of a passenger service system or a vehicle having one or more passenger seats or groups of passenger seats, distributed wireless communication tags, and a passenger service system are described below and illustrated in the associated drawings. Unless otherwise specified, a passenger service system or vehicle containing a passenger service system with various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other structures providing services to distributed personnel stations. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A passenger service system supporting passengers in a vehicle may have various functionalities. For example, a passenger request assembly may receive a service request from a passenger seated in the vehicle, and a server system may determine the location of the passenger based on a passenger seat associated with the request. In some examples, a control signal may be provided to a passenger service assembly to control operation of a passenger service element, such as a reading light, in response to the passenger service request.

Aspects of a passenger service system may be embodied as a computer method, computer system, or computer program product. Accordingly, aspects of the passenger service system may take the form of an entirely hardware embodiment or an embodiment combining software and hardware aspects, all of which may generally be referred to herein as a "circuit," "module," or "system." Software may include firmware, resident software, micro-code, and the like. Furthermore, aspects of the passenger service system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium and frequency, including but not limited to wireless, wireline, optical fiber cable, RF, optical, acoustical, and/or the like, and/or any suitable combination of these.

Computer program code for carrying out operations for aspects of the passenger service system may be written in one or any combination of programming languages, including object-oriented programming languages such as Java, Smalltalk, C++, and/or the like, interpreted programming languages such as Python, and conventional procedural programming languages such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of a passenger service system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions when executed on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of a passenger service system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary passenger service systems and vehicles having passenger service systems, as well as related systems and/or methods. The examples in these sections are intended for illustration and should not be interpreted as limiting the entire scope of passenger service systems or vehicles. Each section may include one or more distinct inventions, and/or contextual or related information, function, and/or structure.

Example 1

This example is an illustrative local positioning system disposed in an expanse having distributed wireless communication tags. See FIG. 1.

In this example, an expanse-defining structure is shown generally at 100. Expanse-defining structure 100 may be defined by an associated surface, such as a tract of land, a floor, wall, ceiling, or roof of a building, or a vehicle, shown generally at 101. Vehicle 101 may be any vehicle that is configured to transport one or more passengers or goods, such as cargo. Vehicle 101 may be a boat, bus, truck, or aircraft, such as aircraft 102. In this example, aircraft 102 includes an expanse 103 in the form of a passenger cabin 104 defined by boundaries of or partitions in aircraft 102, such as walls, ceiling, and floor. Aircraft 102 also includes an in-transit entertainment system 106, and a local positioning system 107 in the form of a passenger service system 108. Entertainment system 106 provides audio, video, and data service to passengers, and is independent of passenger service system 108, which provides personal services, such as controls for reading lights and attendant call lights.

Passenger cabin 104 may include one or more passenger seats, such as passenger seat 110, for supporting one or more passengers, such as a passenger 112, during vehicle transit. A plurality 114 of wireless communication tags 116 are supported in spaced-apart relationship in a defined configuration relative to the structure, such as supported in the structure along the expanse or supported by the structure in the expanse. For example, the configuration of plurality 114 of wireless communication tags 116 may be arrayed in a regular pattern, such as a matrix or grid, or in an irregular configuration appropriate for the shape and character of the passenger cabin or arrangement of the passenger seat or seats. The communication tags may be supported in the cabin ceiling or floor, or supported in the cabin such as by mounting in passenger-seating structures. In FIG. 1, an exemplary line of communication tags 116 are identified as communication tags V, W, and X, which tags may be members of a larger array. The configuration is such that one or more communication tags 116 are in proximity to a passenger seat 110 or group of passenger seats 110.

Wireless communication tags 116 may be active or passive communication tags using an appropriate short-range communication technology such as RFID, near-field communication, optical, or infrared. The communication tags 116 provide identification information when read. An ordered list of communication tags 116 may be created that correlate each communication tag 116 or group of communication tags 116 with a physical position in the passenger cabin 104. For example, for an aircraft 102, each communication tag 116 or set of communication tags 116 may be indexed with an airplane station number defined in terms of an established aircraft coordinate system for aircraft 102. For example, passenger seat 110 may be located in station X and be proximate to associated communication tag X.

In this example, passenger service system 108 includes a passenger-request assembly 118, a data processing assembly 120, and a passenger-service assembly 122. A power distribution system, not shown, provides power to the various system components and may include power outlet interfaces at the passenger seats 110. The passenger-request assembly 118 is configured to receive as an input a passenger-service request from passenger 112 while passenger 112 is seated in passenger seat 110 via a passenger interface, such as a passenger control unit. For example, passenger 112 may request that a reading light directed over passenger seat 110 be turned on or off by pressing a button or other passenger input device.

Prior to or upon receipt of the passenger-service request, Passenger-request assembly 118 includes a reader assembly 123 having a tag reader 124 configured to read wirelessly communication tag data from at least one wireless communication tag 116 of the plurality 114 of wireless communication tags 116. For example, tag reader 124 may read only communication tag X, or tag reader 124 may read more than one communication tag 116, such as both communication tags W and X. Depending on the positions of the communication tags 116 proximate to tag reader 124 of reader assembly 123 of passenger-request assembly 118, and thereby proximate the passenger seat 110 from which the passenger-service request was input, passenger-request assembly 118 reads one or more of the communication tags 116.

The tags that passenger-request assembly 118 reads may be limited to those that are within a certain threshold distance from passenger-request assembly 118. The threshold distance may be set by the strength of the signal output by passenger-request assembly 118. If passenger-request assembly 118 reads more than one communication tag 116, the passenger-request assembly 118 may be configured to identify the communication tag 116 that produces the strongest signal. Alternatively, the passenger-request assembly 118 may simply identify the one or more communication tags 116 that are read, or that have at least a threshold signal strength.

Passenger-request assembly 118 is also configured to generate a passenger-request signal representative of the passenger-service request input by passenger 112 and, if appropriate, the read tag data from one or more of the communication tags that were read. Passenger-request assembly 118 may be further configured to generate a communication-tag signal representative of the read tag data if the communication tags 116 are read prior to the passenger inputting the passenger-service request. Passenger-request assembly 118 includes a wireless transmitter 125 for transmitting wirelessly the passenger-request signal to server assembly 126. Wireless transmitter 125 may also be part of a transceiver. In a vehicle 101 having a plurality of passenger-request assemblies 118 to support a plurality of passenger seats 110 or a plurality of groups of passenger seats 110, the passenger-request assemblies 118 may communicate with server assembly 126 over a wireless network.

The wireless network may be of a form suitable for the area of passenger cabin 104 having passenger-request assemblies relative to the location of server assembly 126. For example, the wireless network may be based on Bluetooth™, WiFi, ZigBee, infrared, or other appropriate technology.

Data processing assembly includes a server assembly 126. Server assembly 126 includes a wireless transceiver 127 configured to wirelessly receive the transmitted passenger-request signal and, if appropriate, the communication-tag signal, from passenger-request assembly 118. In embodiments in which server assembly 126 communicates wirelessly with only the passenger-request assemblies 118, wireless transceiver 127 may simply be a wireless receiver. Wireless transceiver 127 may also be a combination of a receiver and a transmitter.

Server assembly 126 includes a passenger services server 128 that then determines a seat location within passenger cabin 104, and thereby within aircraft 102, and more generally vehicle 101, based on the passenger-service request and the read tag data. Server assembly 126 maps the passenger-request assembly 118 relative to the vehicle or aircraft coordinate system based on a known configuration of the communication tags 116 in the vehicle, such as relative to the vehicle coordinate system, and based on the communication tag data received in the communication-tag signal. Passenger seat 110 is identified from the mapping of passenger-request assembly 118 and the passenger-seat information in the passenger-request signal.

Passenger services server 128 of server assembly 126 is further configured to generate a control signal based at least in part on the transmitted passenger-request signal, containing the passenger service request and read tag data, and the determined seat location. The control signal is transmitted using wireless transceiver 127 to a wireless receiver 130 in passenger-service assembly 122. Wireless receiver 130 may also be part of a wireless transceiver. In other embodiments, the communication path between server assembly 126 and passenger-service assembly 122 is wired. Further, the communication path between server assembly 126 and passenger-service assembly 122 may be separate from the communication path between passenger-request assembly 118 and server assembly 126.

As mentioned, in this example the communication path between server assembly 126 and passenger-service assembly 122 is wireless. Further, communication between server assembly 126 and both of passenger-request assembly 118 and passenger-service assembly 122 is preferably over a common shared wireless network. In some examples, such as the example discussed below with reference to FIG. 4, the common wireless network may include one or more wireless data concentrators, such as wireless data concentrator 422, interposed between server assembly 126 and one or both of passenger-service assembly 122 and passenger-request assembly 118.

Passenger-service assembly 122 has a passenger-service element 132 corresponding to the passenger-service request and associated with the first seat. For example, the passenger-service element 132 may be a reading light directed toward passenger seat 110. Passenger-service assembly 122 is configured to control operation of passenger-service element 132 in response to the received control signal.

In other examples, local positioning system 107 may have different configurations and functionality. For example, reader assembly 123 and data processing assembly 120 may be components of a hand-held device, such as a tablet or smartphone. Communication between reader assembly 123 and data processing assembly 120 may be wired or wireless. In some examples, reader assembly 123 may be a stand-alone hand-held or otherwise portable device having a wireless transmitter 125 that may be moved to different positions within expanse 103. Data processing assembly 120 may be disposed in any suitable location where transmitter 125 is able to communicate with transceiver 127. Such a configuration may be useful, for example for configuring structure 101, or surveying structure 101 for maintenance and repair.

Example 2

Figure 2:
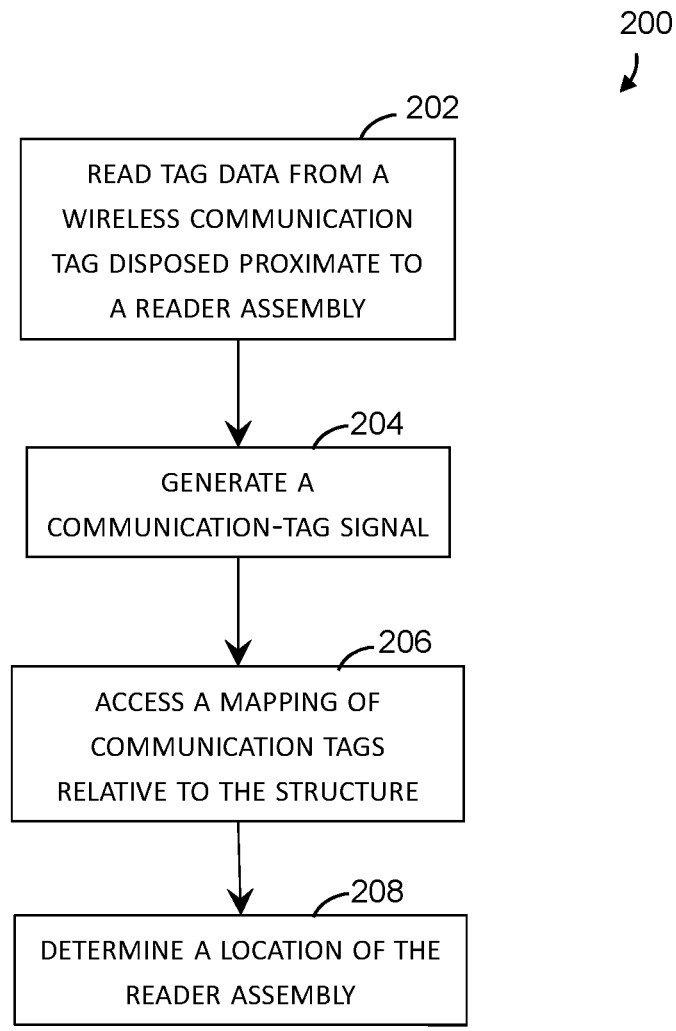
FIG. 2 is an illustration of operations performed by one or more embodiments of a local positioning system.

This example describes a method for locally positioning a reader assembly 123; see FIG. 2. Aspects of structure 100, vehicle 101, aircraft 102, and local positioning system 107 may be utilized in the method steps described below. Where appropriate, reference may be made to previously described components and systems that may be used in carrying out each step. These references are for illustration, and are not intended to limit the possible ways of carrying out any particular step of the method.

FIG. 2 is a flowchart illustrating operations performed by one or more embodiments of local positioning system 107 in an illustrative method, and may not recite the complete process or all steps of the method. FIG. 2 depicts multiple steps of a method, generally indicated at 200, which may be performed in conjunction with local positioning system 107. Although various steps of method 200 are described below and depicted in FIG. 2, the steps need not necessarily all be performed, and in some cases may be performed in a different order than the order shown.

At step 202, reader assembly 123 reads tag data from at least one wireless communication tag 116, such as wireless communication tag X shown in FIG. 1, disposed proximate to reader assembly 123. Communication tag 116 is one of plurality 114 of wireless communication tags 116 disposed in spaced-apart fixed positions within expanse 103 relative to structure 100. In some examples, reader assembly 123 reads more than one wireless communication tag, including wireless communication tag 116, that are located within a limited range of reader assembly 123. At step 204, reader assembly 123 generates a communication tag signal representative of the read tag data.

As is discussed further with reference to FIG. 3 below, at a prior time associated with positioning of wireless communication tags 116 relative to structure 100, the positions of communication tags 116 are mapped relative to structure 100. At step 206, data processing assembly 120 accesses the mapping of the plurality of wireless communication tags with locations of the plurality of wireless communication tags relative to structure 100. At step 208, data processing assembly 120 determines a location of reader assembly 123 based on the read tag data and the mapping of the plurality of wireless communication tags 116 relative to structure 100.

Example 3

Figure 3:
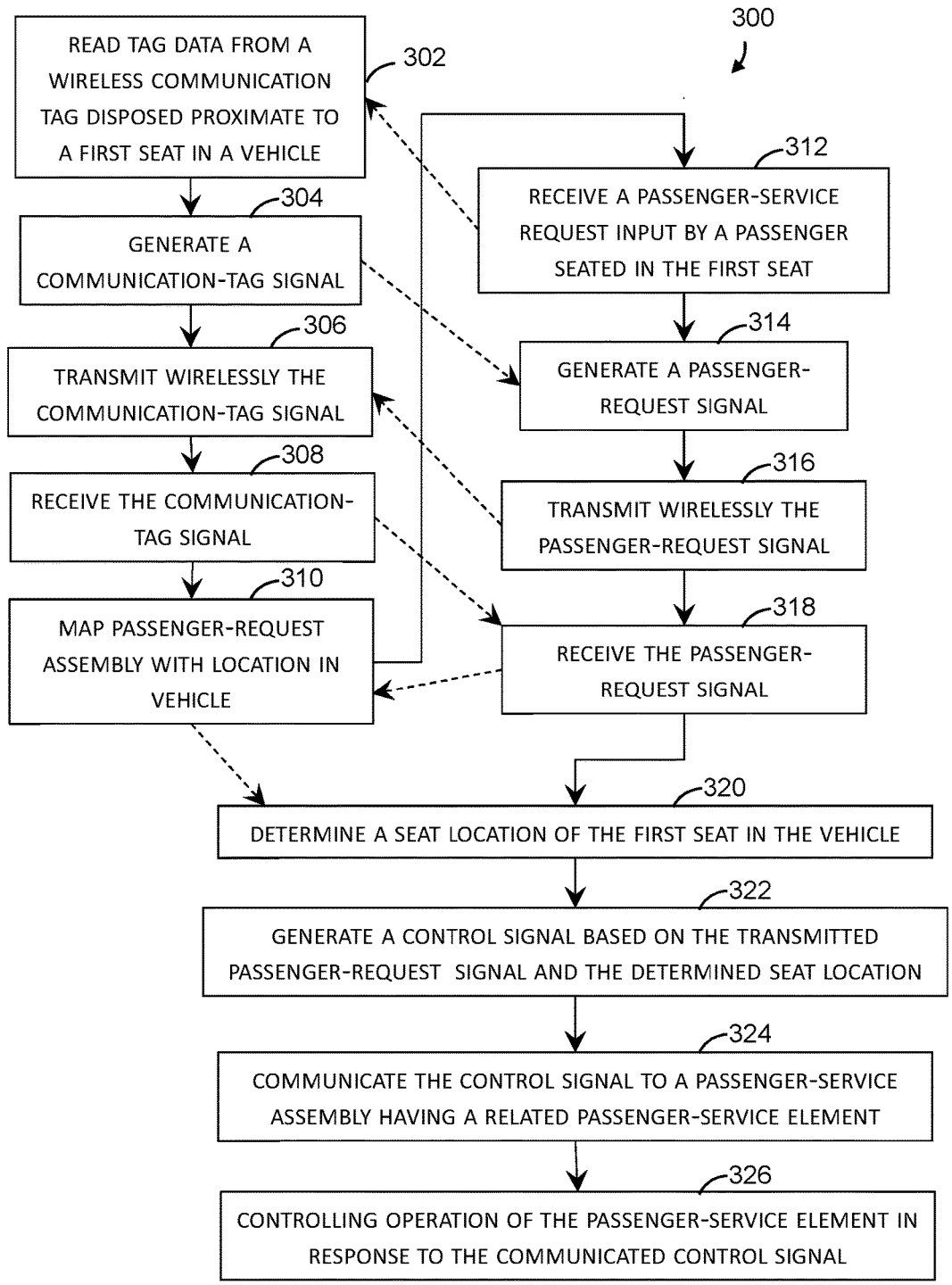
FIG. 3 is an illustration of operations performed by one or more embodiments of a passenger service system.

This example describes a method for communicating a passenger-service request to server assembly 126; see FIG. 3. Aspects of vehicle 101, aircraft 102, and passenger service system 108 may be utilized in the method steps described below. Where appropriate, reference may be made to previously described components and systems that may be used in carrying out each step. These references are for illustration, and are not intended to limit the possible ways of carrying out any particular step of the method.

FIG. 3 is a flowchart illustrating operations performed by one or more embodiments of a passenger service system in an illustrative method, and may not recite the complete process or all steps of the method. FIG. 3 depicts multiple steps of a method, generally indicated at 300, which may be performed in conjunction with passenger service system 108. Although various steps of method 300 are described below and depicted in FIG. 3, the steps need not necessarily all be performed, and in some cases may be performed in a different order than the order shown.

At step 302, passenger-request assembly 118 reads tag data from at least one wireless communication tag 116, such as wireless communication tag X shown in FIG. 1, disposed proximate to passenger seat 110. Communication tag 116 is one of plurality 114 of wireless communication tags 116 disposed in spaced-apart fixed positions distributed about passenger cabin 104 in vehicle 101. In some examples, passenger-request assembly 118 reads more than one wireless communication tag, including wireless communication tag 116, that are located within a limited range of passenger-request assembly 118.

At step 304, passenger-request assembly 118 generates a communication tag signal representative of the read tag data, and at step 306, transmits wirelessly the communication tag signal to server assembly 126. Server assembly 126 receives the communication-tag signal in a step 308, and then maps, in a step 310, passenger-request assembly 118 with the location in the vehicle based on a known configuration of the communication tags 116 in the vehicle, such as relative to a vehicle coordinate system At step 312, passenger-request assembly 118 receives a passenger-service request input by passenger 112 seated in passenger seat 110 of vehicle 101. If not performed previously, passenger-request assembly 118 also performs steps 302 and 304, reading wirelessly communication tag data from a proximate wireless communication tag, and generating the communication-tag signal. In this example, the passenger-request signal and communication-tag signal may be combined into a compound passenger-request signal.

Passenger-request assembly 118, at step 314, generates a passenger-request signal representative of the received passenger-service request. the read tag data. At step 316, passenger-request assembly 118 transmits wirelessly the passenger-request signal to server assembly 126. In this example, the passenger-request signal is transmitted independently of in-transit entertainment system 106. If the communication tag data is read after a passenger-service request is received passenger-request assembly also performs step 306, transmitting the communication-tag signal or, if appropriate, a compound passenger-request signal.

Server assembly 126 receives wirelessly the transmitted passenger-request signal at step 318. If the communication tag data was read after a passenger-service request as received, then step 308 is performed in which server assembly 126 receives the communication-tag signal if not included in the passenger-request signal.

Server assembly 126 also performs step 310, mapping passenger-request assembly 118 with the location of passenger-request assembly 118 in the vehicle, triggered by the receipt of the communication-tag data. At step 320, server assembly 126 determines a seat location of the first seat based at least in part on the received passenger-request signal. In this example, server assembly 126 also generates at step 322 a control signal based at least in part on the transmitted passenger-request signal and the determined seat location, and at step 324, communicates the control signal to passenger-service assembly 122.

As mentioned with regard to passenger-service assembly 122 in FIG. 1, communication of the control signal may be wired or wireless. Passenger-service assembly 122 includes passenger-service element 132 corresponding to the passenger-service request and associated with passenger seat 110. At step 326, passenger-service assembly 122 controls operation of passenger-service element 132 in response to the communicated control signal.

In some embodiments, transmission and reception of the passenger-request signal and communication of the control signal may be performed over a common wireless network. In such embodiments, the method may further include transmitting from passenger-request assembly 118 to server assembly 126 a network logical address of passenger-request assembly 118, such as a MAC address and/or a network IP address. Server assembly 126 creates a mapping of the logical address of passenger-request assembly 118 to a physical location of passenger seat 110.

Example 4

This example is an illustrative passenger service system of an aircraft having passenger seats and distributed wireless communication tags. See FIG. 4.

In this example, an aircraft, shown generally at 400, includes a plurality 402 of passenger seats 404 distributed in the aircraft, an array 406 of wireless communication tags 408, and a local positioning system 409 including a passenger service system 410. Passenger seats 404, wireless communication tags 408, and at least portions of passenger service system 410 may be disposed in a designated passenger area, such as in a passenger cabin, not separately shown to simplify the figure. Similar to passenger service system 108 of vehicle 101, passenger service system 410 is independent of an in-flight entertainment system, also not shown. It will be appreciated that the description of aircraft 102 and counterparts of aircraft 400 described with reference to FIG. 1, apply generally to aircraft 400 unless specific differences are described.

Aircraft 400 may include a plurality of groups of passenger seats 404, such as passenger seat group 412 including passenger seats 414, 416, 418, for supporting a corresponding plurality of passengers, not shown. In a conventional commercial aircraft 400, the groups of passenger seats 404 may be arranged in rows and columns within aircraft 400, with the columns of passenger-seat groups separated by aisles running along the length of aircraft 400. Each group of seats may be assigned a station identification. For example group 412 of passenger seats 404 may be assigned to be Station X.

Figure 4:
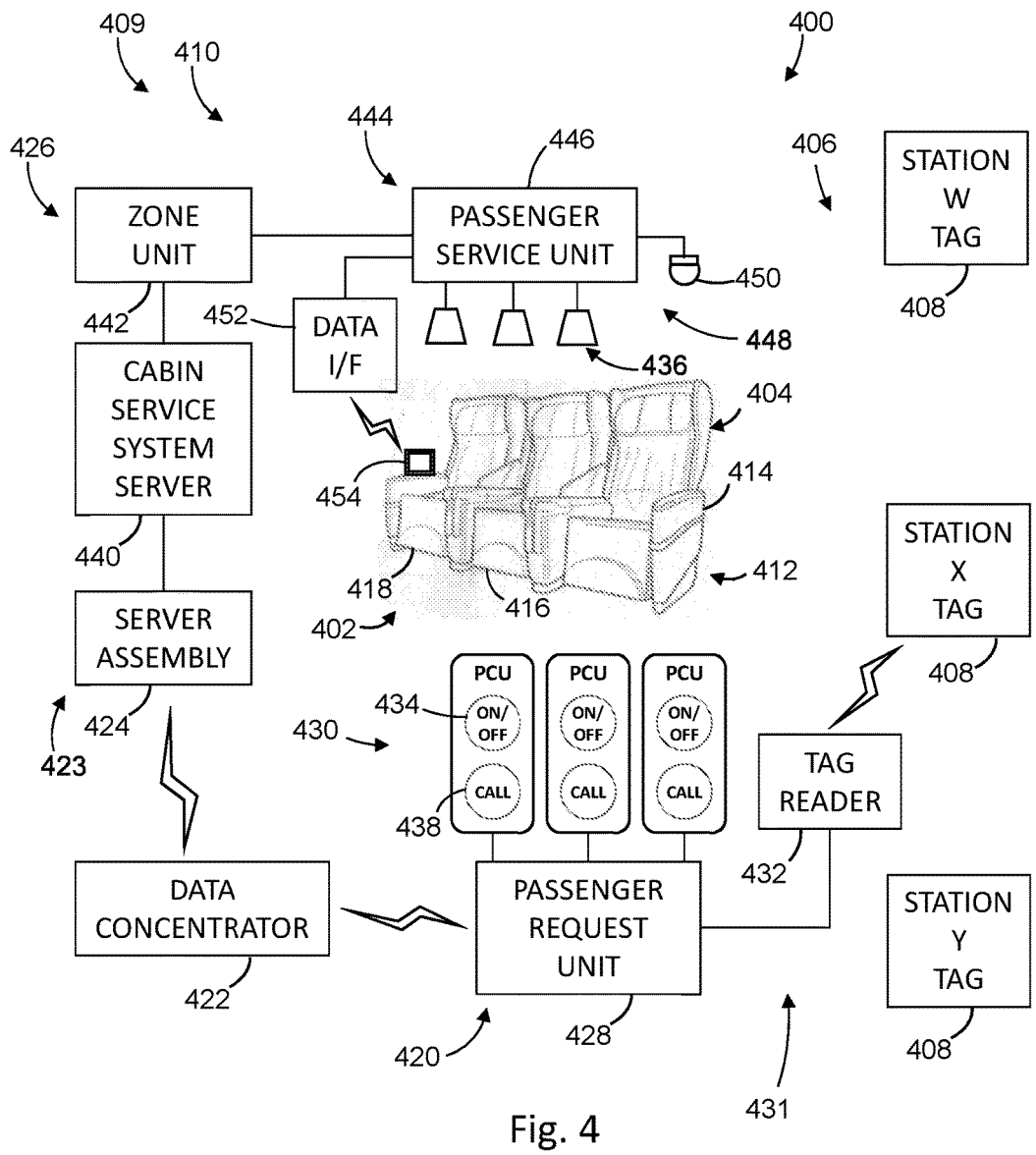
FIG. 4 is a block diagram illustrating another embodiment of a passenger service system in a vehicle.

Although array 406 of wireless communication tags 408 may be in an appropriate configuration, whether in a pattern or irregular in character as appropriate for the shape and character of the passenger cabin or arrangement of passenger seats 404. For example, the configuration of array 406 of wireless communication tags 408 may be a regular pattern, such as a matrix or grid, or in an irregular configuration. In FIG. 4, exemplary communication tags 408 are identified by an associated seating station (Station W tag, Station X tag, and Station Y tag) and are defined in terms of an established aircraft coordinate system for aircraft 400. Station X tag is associated with and proximate to Station X and passenger-seat group 412. Communication tags 408 in this example are indexed with the aircraft station number.

As with wireless communication tags 116, wireless communication tags 408 may be active or passive communication tags using an appropriate short-range communication technology such as RFID, near-field communication, optical, or infrared. Wireless communication tags 408 may be mounted to the aircraft structure, such as in the ceiling or floor of the aircraft cabin, or in selected passenger seats 404. The communication tags 408 provide identification information when read. An ordered list of communication tags 408 may be created that correlate each communication tag 408 or group of communication tags 408 with a physical position in aircraft 400. For example, passenger seat group 412, forming Station X, is proximate to associated communication tag 408 identified as Station X tag.

In this example, passenger service system 410 includes a passenger-request assembly 420, a wireless data concentrator 422, a data processing assembly 423 including a server assembly 424, and a cabin service system 426. The passenger-request assembly 420 includes a passenger-request unit 428, a passenger control unit (PCU) 430 associated with each passenger seat 404, a reader assembly 431 including a wireless communication tag reader 432, and a transmitter or transceiver as discussed with reference to FIG. 1.

Each passenger control unit 430 includes various input devices for use by a passenger to input service requests. Each exemplary passenger control unit 430 illustrated includes a reading light toggle button 434 actuatable to request that a reading light 436 directed over an associated passenger seat be turned on or off, and an attendant-call button 438 actuatable to request personal service from a cabin attendant. Passenger control units 430 are connected to passenger-request unit 428. When an input device on passenger control unit 430 is actuated by a passenger, passenger control unit 430 sends passenger-request unit 428 a passenger-service request including a seat identifier identifying seat 418 within group 412 of passenger seats 408. For example, the passenger may request that reading light 436 directed over passenger seat 418 be turned on or off by pressing toggle button 434. If passenger-seat group 412, for example is in row 42 of passenger seats 408 in aircraft 400, passenger control unit 430 also sends passenger-request unit 428 an identifier indicating the seat within passenger-seat group 412, such as seat "A." In some examples, passenger-request unit 428 determines the seat identifier based on the input port over which the passenger request is received from the passenger control unit 430.

Prior to or upon receipt of the passenger-service request, passenger-request unit 428 controls communication tag reader 432 to read wirelessly communication tag data from at least one wireless communication tag 408, such as the communication tag identified as Station X tag. In this example, wireless communication tags 408 are near-field communication tags, and communication tag reader 432 is a near-field communication-tag reader. Power may be controlled on communication tag reader 432 so that the Station X tag may be the only communication tag 408 close enough to communication tag reader 432 to be read. In other words, communication tag reader 432 is configured to read one or more of the communication tags 408 that are located within a limited range of communication tag reader 432. In this configuration, passenger-request unit 428 may be positioned away from communication tags 408.

Passenger-request unit 428 is also configured to generate a passenger-request signal representative of the passenger-service request, including the seat identifier identifying the seat within the associated seat group 412 and, if appropriate, the tag data read from the Station X tag. Passenger-request unit 428 may be further configured to generate a communication-tag signal representative of the read tag data separate from the passenger-request signal. This facilitates reading the communication tags 408 prior to the passenger inputting the passenger-service request or reading the communication tags as a process independent of the processing of a passenger request. Passenger-request unit 428 of passenger-request assembly 420 may be further configured to associate a physical location of seat group 412 with a logical address of passenger-request assembly 420 when communication of the passenger request to server assembly 424 is over a local area network, as discussed below. Each wireless communication tag 408 read by passenger-request assembly 420 is registered with server assembly 424 using communication-tag signals. Passenger control units 430 in passenger-seat group 412, being associated with the passenger-request assembly 420, are aggregated with passenger-seat group 412.

Passenger-request unit 428 also includes a wireless transmitter like transmitter 125 shown in FIG. 1 for transmitting wirelessly the passenger-request signal to wireless data concentrator 422. Passenger service system 410 may include a plurality of wireless data concentrators 422 distributed throughout the passenger cabin, with each wireless data concentrator receiving passenger-request signals from passenger-request units within a proximate zone or region of the passenger cabin. Each wireless data concentrator 422 then relays the passenger-request signals to a receiver of server assembly 424.

Communications between the passenger-request units 428 and server assembly 424 via wireless data concentrators 422 is preferably over a wireless network. The wireless network may be of a form suitable for an area of the passenger cabin having passenger-request assemblies 420 relative to the locations of wireless data concentrators 422 and of server assembly 424. For example, the wireless network may be based on Bluetooth™, WiFi, ZigBee, infrared, or other appropriate technology.

Server assembly 424 determines a seat location within the passenger cabin of aircraft 400 based on the passenger-service request and the read tag data. Server assembly 424 maps the passenger-request assembly 420 relative to the aircraft coordinate system based on a known configuration of the communication tags 408 in aircraft 400, such as relative to an aircraft coordinate system, and based on the communication tag data received in the passenger-request signal or communication-tag signal. Passenger seat 418 is identified from the mapping of passenger-request assembly 118 and the passenger-seat information in the passenger-request signal. Passenger seat 418 in this example is identified from an index of the passenger seat groups 412 relative to the aircraft coordinate system mapped against the known configuration of the communication tags 408. Server assembly 424 combines the seat row logical to physical mapping and seat number to complete identification of passenger seat 418 by seat row and seat number (e.g., 32A) before it relays commands to cabin service system 426. Since the seats 404 are in known locations, the mapping is done automatically using the communication tag data read by on board NFC tag reader 432. Server assembly 424 further determines the aircraft station number (Station X in this example) based at least in part on the read tag data.

Server assembly 424 is configured to generate a control signal based at least in part on the transmitted passenger-request signal containing the passenger service request, and the determined seat location. In this example, the control signal is transmitted to cabin service system 426.

Cabin service system 426 includes a cabin service system server 440, at least one zone unit 442, and a passenger-service assembly 444, all interconnected by wired communication paths. Server assembly 424 communicates the control signal to cabin service system server 440 also over a wired communication path. The passenger cabin may be divided into various zones for deployment of cabin services. With such a configuration, cabin service system server 440 identifies the zone unit 442 serving Station X passenger-seat group 412 in which passenger seat 418 is located. Zone unit 442 in turn forwards the control signal to passenger-service assembly 444 associated with Station X.

Passenger-service assembly 444 includes a passenger-service unit 446, which controls operation of various passenger-service elements 448. Passenger-service elements 448 are controlled to selectively provide services to the passengers. In this example, passenger-service elements 448 include three reading lights 436, an attendant call light 450, and a wireless data interface 452. Wireless data interface 452 is configured to wirelessly transmit data to a passenger mobile device 454, such as a smartphone, tablet, or laptop provided by the passenger. Optionally, wireless data interface 452 may be connected to passenger-request unit 428 with passenger data being routed from server assembly 424 through passenger-request unit 428.

Passenger-service unit 446, thus, receives the control signal from zone unit 442 and controls operation of the reading light 436 associated with seat 418. If the request was for activation of the attendant call light 450 or to communicate data to passenger via wireless data interface 452, then those corresponding actions would be taken.

Method 300 illustrated in FIG. 3 will thus be seen to apply to passenger service system 410 of aircraft 400 as well. Specifically, at steps 302, 304, 306, the passenger-request assembly 420 reads communication-tag data from at least Station X communication tag 408 disposed proximate to passenger seat group 412 using communication tag reader 432, generates a communication-tag signal by passenger-request unit 428, and transmits the communication-tag signal wirelessly. Server assembly 424 then receives the transmitted communication-tag signal in a step 308, and in a step 310, maps the passenger-request unit 428, and thereby passenger-request assembly 420, with the location in aircraft 400.

At step 312, passenger-request unit 428 of passenger-request assembly 420 receives a passenger-service request input by the passenger seated in passenger seat 418 using passenger control unit 430. Steps 302, 304, 306, 308, and 310 may be performed prior to receipt of a passenger request or in response to receipt of a passenger request, as described with reference to method 300. At step 314, passenger-request unit 428 generates a passenger-request signal representative of the received passenger-service request and, if appropriate, the read tag data, and at step 316, transmits wirelessly the passenger-request signal to server assembly 424 via wireless data concentrator 422. In this example, the passenger-request signal is transmitted independently of an in-flight entertainment system.

Server assembly 424 receives wirelessly the transmitted passenger-request signal at step 318, and at step 320, determines a seat location of the first seat based at least in part on the received passenger-request signal. In this example, server assembly 424 also generates in a step 322 a control signal based at least in part on the transmitted passenger-request signal and the determined seat location, and at step 324, communicates the control signal to passenger-service assembly 444. As mentioned with regard to passenger-service assembly 122 in FIG. 1, communication of the control signal may be wired or wireless. Passenger-service assembly 444 includes passenger-service unit 446 and passenger-service elements 448, including in this example a reading light 436 corresponding to the passenger-service request and associated with passenger seat 418. At step 326, passenger-service unit 446 of passenger-service assembly 444 controls operation of reading light 436 in response to the communicated control signal.

Transmission and reception of the passenger-request signal is performed over a wireless network, and the method further includes transmitting from passenger-request assembly 420 to server assembly 424 a network logical address of passenger-request assembly 420, such as a MAC address and/or a network IP address, and creating by server assembly 424 a mapping of the logical address of passenger-request assembly 420 to a physical location of passenger seat 418.

Further, the passenger-request signal is generated by passenger-request unit 428 with an identifier identifying passenger seat 418 in passenger-seat group 412 with which passenger-request assembly 420 is associated.

Example 5

Figure 5:
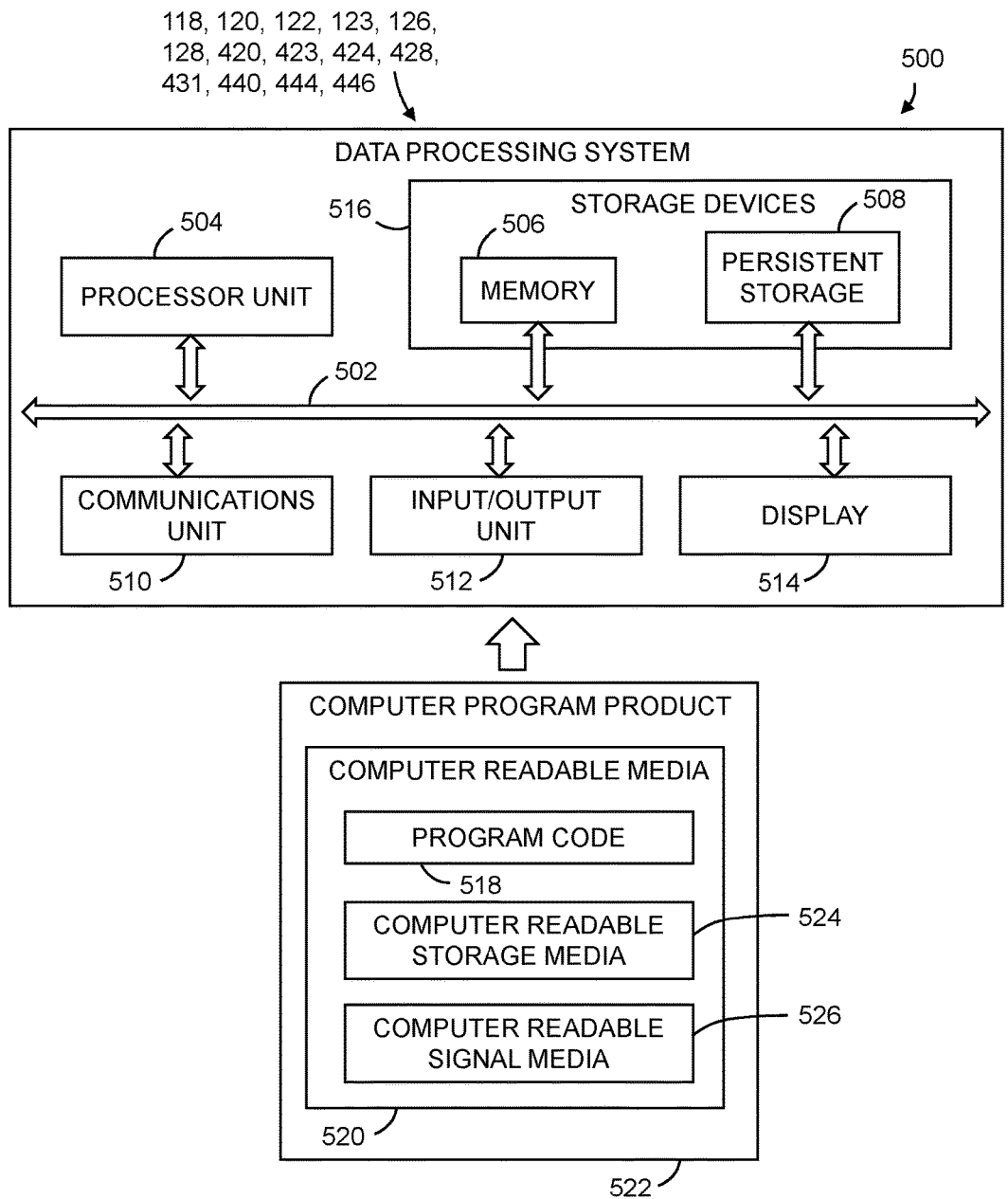
FIG. 5 is a block diagram of various components of an exemplary data processing system that may be used in a passenger service system.

As shown in FIG. 5, this example is an illustrative data processing system 500 suitable for implementing aspects of local positioning systems 107 and 409 and passenger service systems 108 and 410. More specifically, in some examples, devices that are embodiments of data processing systems may include passenger-request assemblies 118 and 420, server 128, passenger-service assemblies 122 and 444, passenger-request unit 428, server assemblies 126 and 424, data processing assemblies 120 and 423, reader assemblies 123 and 431, cabin service system server 440, and passenger-service unit 446. Different combinations of components identified in data processing 500 may be used in different aspects of passenger service systems 108, 410.

In this illustrative example, data processing system 500 includes communications framework 502. Communications framework 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications framework 502.

Processor unit 504 serves to run instructions that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis.

Storage devices 516 also may be referred to as computer-readable storage devices in these examples. Memory 506, in these examples, may be, for example, a random access memory or any other suitable volatile or non-volatile storage device.

Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. In the case of passenger request unit 428, examples include passenger control units 430 and communication tag reader 432. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications framework 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524 or computer-readable signal media 526.

Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

In these examples, computer-readable storage media 524 is a physical or tangible storage device used to store program code 518 rather than a medium that propagates or transmits program code 518. Computer-readable storage media 524 is also referred to as a computer-readable tangible storage device or a computer-readable physical storage device. In other words, computer-readable storage media 524 is non-transitory.

Alternatively, program code 518 may be transferred to data processing system 500 using computer-readable signal media 526. Computer-readable signal media 526 may be, for example, a propagated data signal containing program code 518. For example, computer-readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer-readable signal media 526 for use within data processing system 500. For instance, program code stored in a computer-readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system without some components or including components in addition to and/or in place of those illustrated for data processing system 500. Other components shown in FIG. 5 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications framework 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in communications framework 502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 6

Figure 6:
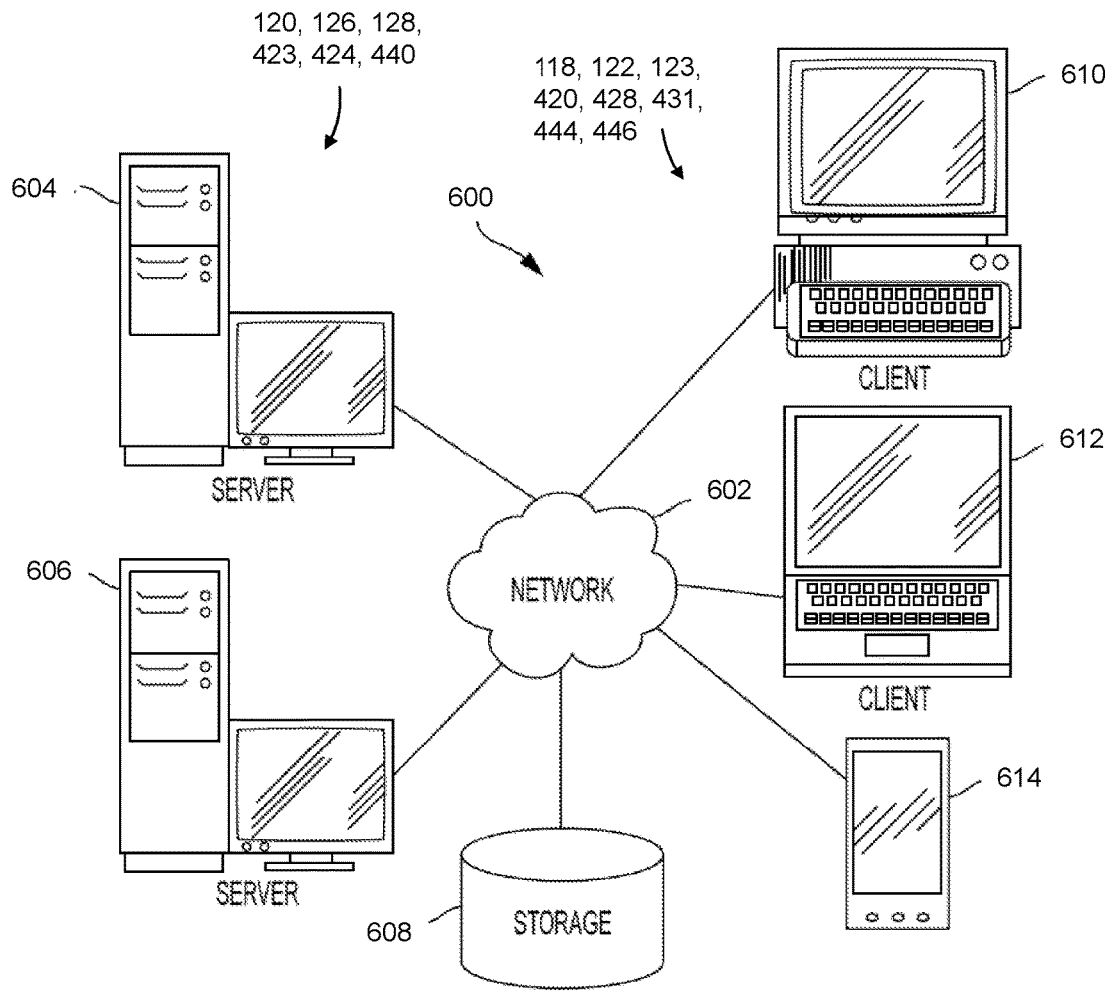
FIG. 6 is block diagram of an exemplary computer network system that may be used in embodiments of a passenger service system.

As shown in FIG. 6, this example is a general network data processing system 600, interchangeably termed a network, a computer network, a network system, or a distributed network, aspects of which may be included in one or more illustrative embodiments of local positioning systems 107 and 409, and passenger service systems 108 and 410. For example, as described above, passenger-request assembly 118, server 128 and passenger-service assembly 122 communicate using a wireless network. Similarly, passenger request unit 428 and server assembly 424 communicate using a wireless network, and cabin service system server 440 may communicate with passenger service unit 446 via zone unit 442 over a network. It should be appreciated that FIG. 6 is provided as an illustration of one implementation and is not intended to imply any limitation with regard to environments in which different embodiments may be implemented. Many modifications to the depicted environment may be made.

Network data processing system 600 is a network of computers, each of which is an example of data processing system 400, and other components. Network data processing system 600 may include network 602, which is a medium configured to provide communications links between various devices and computers connected together within network data processing system 600. Network 602 may include connections such as wired or wireless communication links, fiber optic cables, and/or any other suitable medium for transmitting and/or communicating data between network devices, or any combination thereof.

In the depicted example, a first network device 604 and a second network device 606 connect to network 602, as does an electronic storage device 608. Network devices 604 and 606 are each examples of data processing system 500, described above. In the depicted example, devices 604 and 606 are shown as server computers. In some examples, devices 604 and 606 may be embodiments of server 128, server assemblies 126 and 424, data processing assemblies 120 and 423, and cabin service system server 440. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 610, a client laptop or tablet 612, and/or a client smart device 614, may connect to network 602. In some examples, devices 610, 612, and 614 may be embodiments of passenger-request assemblies 118 and 420, passenger-service assemblies 122 and 444, passenger-request unit 428, reader assemblies 123 and 431, and passenger-service unit 446. Each of these devices is an example of data processing system 500, described above regarding FIG. 5. Client electronic devices 610, 612, and 614 may include, for example, one or more personal computers, network computers, and/or mobile computing devices such as personal digital assistants (PDAs), smart phones, handheld gaming devices, wearable devices, and/or tablet computers, and the like. In the depicted example, server 604 provides information, such as boot files, operating system images, and applications to one or more of client electronic devices 610, 612, and 614. Client electronic devices 610, 612, and 614 may be referred to as "clients" with respect to a server such as server computer 604. Network data processing system 600 may include more or fewer servers and clients or no servers or clients, as well as other devices not shown.

Client smart device 614 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near-field communications (NFC), BLUETOOTH®, WiFi, or mobile broadband networks. Wireless connectively may be established among smartdevices, smartphones, computers, and other devices to form a mobile network where information can be exchanged.

Program code located in system 600 may be stored in or on a computer recordable storage medium, such as persistent storage 408 in Example 4, and may be downloaded to a data processing system or other device for use. For example, program code may be stored on a computer recordable storage medium on server computer 604 and downloaded for use to client 610 over network 602 for use on client 610.

Network data processing system 600 may be implemented as one or more of a number of different types of networks. For example, system 600 may include an intranet, a local area network (LAN), a wide area network (WAN), or a personal area network (PAN). In some examples, network data processing system 600 includes the Internet, with network 602 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 6 is intended as an example, and not as an architectural limitation for any illustrative embodiments.

Example 7

This section describes additional aspects and features of a passenger service system or a vehicle, such as an aircraft, having a passenger service system, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A local positioning system comprising:
a reader assembly configured to read tag data from at least one wireless communication tag of a plurality of wireless communication tags disposed in spaced-apart fixed positions relative to a structure extending along an expanse when the reader assembly is disposed in the expanse proximate to the at least one wireless communication tag, the reader assembly being further configured to generate a communication-tag signal representative of the read tag data; and a data processing assembly configured to access a mapping of the plurality of wireless communication tags relative to the structure and determine a location of the reader assembly based on the read tag data and the mapping of the plurality of wireless communication tags relative to the structure.

A2. The local positioning system of paragraph A1, where the structure is a vehicle, the expanse is a compartment in the vehicle, and the plurality of wireless communication tags are distributed along the compartment, and wherein the local positioning system is manually movable about the compartment to positions proximate to selected ones of the plurality of wireless communication tags.

A3. The local positioning system of paragraph A2, where the vehicle is an aircraft, the compartment is a cargo or passenger cabin, and the data processing assembly is configured to store the determined location of the reader assembly.

A4. A passenger service system comprising the local positioning system of paragraph A1, where the structure is a vehicle, the expanse is a compartment in the vehicle, the plurality of wireless communication tags are distributed along the compartment with the at least one wireless communication tag disposed proximate to a first seat in the compartment, the passenger service system further comprising a passenger-request assembly including the reader assembly, and being configured to read tag data from the at least one wireless communication tag disposed proximate to the first seat in the vehicle, the passenger-request assembly being further configured to generate a communication-tag signal representative of the read tag data and a passenger-request signal representative of a passenger-service request input by a passenger seated in the first seat, and transmit wirelessly the communication tag signal and the passenger-request signal; and the data processing assembly including a server assembly configured to wirelessly receive the transmitted communication tag signal and the passenger-request signal and determine a seat location of the first seat based on the passenger-service request and the read tag data.

A5. The passenger service system of paragraph A4 may further include a passenger-service assembly having a passenger-service element corresponding to the passenger-service request and associated with the first seat, the passenger-service assembly configured to control operation of the passenger-service element in response to a received control signal, the server assembly being further configured to generate the control signal based at least in part on the transmitted passenger-request signal and the determined seat location, and communicate the control signal to the passenger-service assembly.

A6. The passenger service system of paragraph A5, wherein the server assembly is configured to transmit the control signal wirelessly and the passenger-service assembly is configured to receive the control signal wirelessly.

A7. The passenger service system of paragraph A6, wherein the server assembly communicates wirelessly with the passenger-service assembly and the passenger-request assembly using a common wireless network.

A8. The passenger service system of paragraph A7, wherein the common wireless network includes one or more wireless data concentrators interposed between the server assembly and one or both of the passenger-service assembly and the passenger-request assembly.

A9. The passenger service system of any of paragraphs A4-A8, wherein the passenger-request assembly is associated with a first group of seats including the first seat and the passenger-request assembly identifies in the passenger-request signal the first seat in the first group of seats with which the passenger-service request is associated.

A10. The passenger service system of paragraph A9, wherein the passenger-request assembly further includes a passenger control unit associated with each seat in the first group of seats, and the passenger-request assembly is further configured to associate a physical location of the first seat group with a logical address of the passenger-request assembly, register each wireless communication tag read by the passenger-request assembly with the server assembly using communication-tag signals, and aggregate the passenger control units associated with the passenger-request assembly with the first group of seats.

A11. The passenger service system of any of paragraphs A4-A10, wherein the passenger-request assembly is configured to read one or more of the wireless communication tags that are located within a limited range of the passenger-request assembly.

A12. The passenger service system of any of paragraphs A4-A8, where the vehicle includes a plurality of groups of seats in the vehicle, and wherein each tag is associated with a seat group location comprising a vehicle station number, and the server assembly further determines the vehicle station number based at least in part on the read tag data.

A13. The passenger service system of any of paragraphs A4-A6, wherein the server assembly communicates with the passenger-request assembly over a wireless network, the passenger-request assembly has a network logical address that the passenger-request assembly communicates to the server assembly, and the server assembly creates a mapping of the logical address of the passenger-request assembly to a physical location of the first seat.

A14. The passenger service system of any of paragraphs A4-A13, where the vehicle also includes an in-transit entertainment system that provides entertainment media to the first seat, and wherein the passenger-request assembly operates independently of the in-transit entertainment system.

A15. The passenger service system of any of paragraphs A4-A14, wherein the passenger-request assembly includes a passenger control unit associated with the first seat and configured to receive a passenger input on the passenger control unit from the passenger sitting in the first seat and generate the passenger-service request representative of the passenger input.

A16. The passenger service system of paragraph A15, wherein the passenger-request assembly is associated with a first group of separately identifiable seats including the first seat and the passenger-service request includes an identifier identifying the first seat in the first group of seats.

A17. The passenger service system of any of paragraphs A4-A16, where the wireless communication tags are near-field communication tags, and wherein the passenger-request assembly includes a near-field communication-tag reader.

A18. The passenger service system of any of paragraphs A4-A17, wherein the passenger-request assembly or the passenger-service assembly includes a wireless interface to wirelessly transmit data to a passenger mobile device.

B1. A method comprising: reading tag data from at least one wireless communication tag of a plurality of wireless communication tags disposed in spaced-apart fixed positions relative to a structure extending along an expanse with a reader assembly disposed in the expanse proximate to the at least one wireless communication tag;
generating a communication-tag signal representative of the read tag data;
accessing a mapping of the plurality of wireless communication tags relative to the structure; and
determining a location of the reader assembly based on the read tag data and the mapping of the plurality of wireless communication tags relative to the structure.

B2. The method of paragraph B1, where the structure is an aircraft and the expanse is a cargo or passenger cabin, the method further comprising storing the determined location of the reader assembly.

B3. The method of paragraph B1, where the structure is a vehicle, the expanse is a compartment in the vehicle, and the plurality of wireless communication tags are distributed along the compartment with the at least one wireless communication tag disposed proximate to a first seat in the compartment, the method further comprising:
transmitting wirelessly the communication-tag signal by a passenger-request assembly including the reader assembly;
receiving a passenger-service request input by a passenger seated in the first seat by the passenger-request assembly;
generating by the passenger-request assembly a passenger-request signal representative of the received passenger-service request;
transmitting wirelessly the passenger-request signal by the passenger-request assembly;
receiving wirelessly by a server assembly included in the data processing assembly, the transmitted communication-tag signal and passenger-request signal; and
determining by the server assembly a seat location of the first seat based at least in part on the received communication-tag signal and passenger-request signal.

B4. The method of paragraph B3 further comprising:
generating a control signal based at least in part on the transmitted passenger-request signal and the determined seat location;
communicating the control signal to a passenger-service assembly having a passenger-service element corresponding to the passenger-service request and associated with the first seat; and
controlling operation of the passenger-service element in response to the communicated control signal.

B5. The method of paragraph B2, wherein communicating the control signal includes transmitting the control signal wirelessly and receiving by the passenger-service assembly the control signal wirelessly.

B6. The method of paragraph B3, wherein receiving wirelessly the transmitted passenger-request signal and transmitting the control signal wirelessly includes receiving the transmitted passenger-request signal and transmitting the control signal using a common wireless network.

B7. The method of any of paragraphs B1-B4, wherein generating a passenger-request signal includes generating the passenger-request signal with an identifier identifying the first seat in a first group of seats with which the passenger-request assembly is associated.

B8. The method of paragraph B5, where the passenger-request assembly further includes a passenger control unit associated with each seat in the first group of seats, the method further comprising associating a physical location of the first seat group with a logical address of the passenger-request assembly, registering each wireless communication tag read by the passenger-request assembly with the server assembly using communication-tag signals, and aggregating the passenger control units associated with the passenger-request assembly with the first group of seats.

B9. The method of any of paragraphs B3-B8, wherein reading tag data from at least one wireless communication tag includes reading one or more wireless communication tags, including the at least one wireless communication tag, that are located within a limited range of the passenger-request assembly.

B10. The method of any of paragraphs B3-B10, where the vehicle includes a plurality of groups of seats in the vehicle and each tag is associated with a seat group location comprising a vehicle station number, the method further comprising determining by the server assembly the vehicle station number based at least in part on the read tag data.

B11. The method of any of paragraphs B3-B5, wherein transmitting wirelessly the passenger-request signal and receiving wirelessly the transmitted passenger-request signal includes transmitting and receiving the passenger-request signal over a wireless network, the method further comprising transmitting from the passenger-request assembly to the server assembly a network logical address of the passenger-request assembly, and creating by the server assembly a mapping of the logical address of the passenger-request assembly to a physical location of the first seat.

B12. The method of any of paragraphs B3-B11, where the vehicle includes an in-transit entertainment system that provides entertainment media to the first seat, and wherein transmitting wirelessly the passenger-request signal by the passenger-request assembly includes transmitting wirelessly the passenger-request signal independently of the in-transit entertainment system.

B13. The method of any of paragraphs B3-B12, further comprising receiving the passenger-service request from the passenger sitting in the first seat on a passenger control unit associated with the first seat and included in the passenger-request assembly.

B14. The method of paragraph B13, where the passenger-request assembly is associated with a first group of separately identifiable seats including the first seat, and wherein generating a passenger-request signal includes generating the passenger-request signal with an identifier identifying the first seat in the first group of seats.

B15. The method of any of paragraphs B3-B14, further comprising transmitting wirelessly from the server assembly passenger-related data, receiving by the passenger-request assembly or the passenger-service assembly the transmitted passenger-related data, and transmitting wirelessly by the passenger-request assembly or passenger-service assembly the received passenger-related data to a passenger mobile device.

C. A computer program product comprising one or more computer readable storage mediums having one or more sets of computer readable program instructions embodied therewith, the one or more set of computer readable program instructions, when executed by one or more processors, configuring the one or more processors to perform any of methods B1-B15.

D1. 1. An aircraft comprising a passenger cabin having a plurality of groups of associated passenger seats distributed in the passenger cabin, a first group of associated passenger seats of the plurality of groups of associated passenger seats including at least a first passenger seat;

a plurality of wireless communication tags disposed in spaced-apart fixed positions within the passenger cabin; and a passenger service system including a wireless communication-tag reader, a passenger-request unit, and a server assembly, the wireless communication-tag reader operatively coupled to the passenger-request unit, disposed proximate to the first group of associated passenger seats, and configured to read one or more of the wireless communication tags proximate to the wireless communication-tag reader, the passenger-request unit being configured to generate a communication-tag signal representative of the read tag data and a passenger-request signal representative of a passenger-service request input by a passenger seated in the first passenger seat, and transmit wirelessly the communication-tag signal and the passenger-request signal; and the server assembly configured to wirelessly receive the transmitted communication-tag signal and passenger-request signal and determine a seat location in the passenger cabin of the first seat based on the passenger-service request and the read tag data.

D2. The aircraft of paragraph D1, wherein the passenger service system further includes the passenger service system of any of paragraphs A2-A15.

Advantages, Features, Benefits

The different embodiments of the local positioning systems and the passenger service systems and associated structure, such as a vehicle, described herein provide several advantages over known solutions for providing in-transit services to passengers. For example, the illustrative embodiments of passenger service systems and vehicles described herein allow determination of passenger seat locations automatically. This automatic determination simplifies and shortens vehicle system configuration, particularly as applied to aircraft. Additionally, and among other benefits, illustrative embodiments of the passenger service systems and vehicles described herein provides separation of passenger services functions and entertainment functions. The conventional tightly coupling of entertainment features with personal service features limits the options airline owners have for providing personal services to airplane passengers. It overcomes the physical to logical mapping challenges when the physical topology of wired component interconnections is not available with wireless interfaces. No known system or device can perform these functions, particularly in passenger aircraft. Thus, the illustrative embodiments described herein are particularly useful for passenger aircraft. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A passenger service system comprising:
a passenger-request assembly configured to read tag data from at least one wireless communication tag of a plurality of wireless communication tags disposed in spaced-apart fixed positions distributed along a compartment in a vehicle with the at least one wireless communication tag disposed proximate to a first seat in the compartment, the passenger-request assembly being disposed in the compartment proximate to the at least one wireless communication tag and configured to read tag data from the at least one wireless communication tag, generate a communication-tag signal representative of the read tag data and a passenger-request signal representative of a passenger-service request input by a passenger seated in the first seat, and transmit the communication tag signal and the passenger-request signal; and
a data processing assembly, remote from the passenger-request assembly, the data processing assembly including a server assembly configured to receive the transmitted communication tag signal and the passenger-request signal, access a mapping of the plurality of wireless communication tags relative to the vehicle, and determine a seat location of the first seat based on the passenger-service request, the read tag data, and the mapping of the plurality of wireless communication tags relative to the vehicle.

2. The passenger service system of claim 1 further comprising a passenger-service assembly having a passenger-service element corresponding to the passenger-service request and associated with the first seat, the passenger-service assembly configured to control operation of the passenger-service element in response to a received control signal, the server assembly being further configured to generate the control signal based at least in part on the transmitted passenger-request signal and the determined seat location, and communicate the control signal to the passenger-service assembly.

3. The passenger service system of claim 1, wherein the passenger-request assembly is associated with a first group of seats including the first seat and the passenger-request assembly identifies in the passenger-request signal the first seat in the first group of seats with which the passenger-service request is associated.

4. The passenger service system of claim 3, wherein the passenger-request assembly further includes a passenger control unit associated with each seat in the first group of seats, and the passenger-request assembly is further configured to associate a physical location of the first group of seats with a logical address of the passenger-request assembly, register each wireless communication tag read by the passenger-request assembly with the server assembly using communication-tag signals, and aggregate the passenger control units associated with the passenger-request assembly with the first group of seats.

5. The passenger service system of claim 1, wherein the vehicle includes a plurality of groups of seats in the vehicle, and wherein each tag is associated with a seat group location comprising a vehicle station number, and the server assembly further determines the vehicle station number based at least in part on the read tag data.

6. The passenger service system of claim 1, wherein the server assembly communicates with the passenger-request assembly over a wireless network, the passenger-request assembly has a network logical address that the passenger-request assembly communicates to the server assembly, and the server assembly creates a mapping of the logical address of the passenger-request assembly to a physical location of the first seat.

7. A method comprising:
reading tag data from at least one wireless communication tag of a plurality of wireless communication tags distributed in spaced-apart fixed positions extending along a compartment in a vehicle with a passenger-request assembly disposed in the compartment proximate to the at least one wireless communication tag with the at least one wireless communication tag disposed proximate to a first seat in the compartment;
generating, by the passenger-request assembly, a communication-tag signal representative of the read tag data;
transmitting the communication-tag signal by the passenger-request assembly;
receiving by a data processing assembly including a server assembly remote from the passenger-request assembly the transmitted communication-tag signals;
receiving a passenger-service request input by a passenger seated in the first seat by the passenger-request assembly;
generating by the passenger-request assembly a passenger-request signal representative of the received passenger-service request;
transmitting the passenger-request signal by the passenger-request assembly;
receiving by the server assembly the transmitted passenger-request signal;
accessing, by the data processing assembly, a mapping of the plurality of wireless communication tags relative to the vehicle; and
determining by the server assembly a seat location of the first seat based at least in part on the received communication-tag signal, the received passenger-request signal, and the mapping of the plurality of wireless communication tags relative to the vehicle.

8. The method of claim 7 further comprising:
generating a control signal based at least in part on the transmitted passenger-request signal and the determined seat location;
communicating the control signal to a passenger-service assembly having a passenger-service element corresponding to the passenger-service request and associated with the first seat; and
controlling operation of the passenger-service element in response to the communicated control signal.

9. The method of claim 8, wherein receiving the transmitted passenger-request signal and communicating the control signal includes receiving the transmitted passenger-request signal and communicating the control signal using a common wireless network.

10. The method of claim 9, wherein the passenger-request assembly further includes a passenger control unit associated with each seat in a first group of seats, the method further comprising associating a physical location of the first group of seats with a logical address of the passenger-request assembly, registering each wireless communication tag read by the passenger-request assembly with the server assembly using communication-tag signals, and aggregating the passenger control units associated with the passenger-request assembly with the first group of seats.

11. The method of claim 7, wherein the vehicle includes a plurality of groups of seats in the vehicle and each tag is associated with a seat group location comprising a vehicle station number, the method further comprising determining by the server assembly the vehicle station number based at least in part on the read tag data.

12. The method of claim 7, wherein transmitting the passenger-request signal and receiving the transmitted passenger-request signal includes transmitting and receiving the passenger-request signal over a wireless network, the method further comprising transmitting from the passenger-request assembly to the server assembly a network logical address of the passenger-request assembly, and creating by the server assembly a mapping of the logical address of the passenger-request assembly to a physical location of the first seat.

13. An aircraft comprising:
a passenger cabin having a plurality of groups of associated passenger seats distributed in the passenger cabin, a first group of associated passenger seats of the plurality of groups of associated passenger seats including at least a first passenger seat;
a plurality of wireless communication tags disposed in spaced-apart fixed positions within the passenger cabin; and
a passenger service system including a wireless communication-tag reader, a passenger-request unit, and a server assembly, the wireless communication-tag reader operatively coupled to the passenger-request unit, disposed proximate to the first group of associated passenger seats, and configured to read one or more of the wireless communication tags proximate to the wireless communication-tag reader, the passenger-request unit being configured to generate a communication-tag signal representative of the read tag data and a passenger-request signal representative of a passenger-service request input by a passenger seated in the first passenger seat, and transmit wirelessly the communication-tag signal and the passenger-request signal, and the server assembly configured to wirelessly receive the transmitted communication-tag signal and passenger-request signal and determine a seat location in the passenger cabin of the first seat based on the passenger-service request and the read tag data.

14. The aircraft of claim 13, wherein the passenger service system further includes a passenger-service assembly having a passenger-service element corresponding to the passenger-service request and associated with the first seat, the passenger-service assembly configured to control operation of the passenger-service element in response to a received control signal, the server assembly being further configured to generate the control signal based at least in part on the transmitted passenger-request signal and the determined seat location, and communicate the control signal to the passenger-service assembly.

15. The aircraft of claim 14, wherein the server assembly communicates wirelessly with the passenger-service assembly and the passenger-request unit using a common wireless network.

16. The aircraft of claim 13, further comprising a passenger control unit associated with each seat in the first group of seats with each passenger control unit operatively coupled to the passenger-request unit, wherein the passenger-request unit is further configured to associate a physical location of the first seat group with a logical address of the passenger-request unit, register each wireless communication tag read by the wireless communication tag reader with the server assembly, and aggregate the passenger control units coupled to the passenger-request unit with the first group of seats.

17. The aircraft of claim 13, wherein the aircraft includes a plurality of groups of seats in the aircraft, and wherein each tag is associated with a seat group location comprising an aircraft station number, and the server assembly further determines the aircraft station number based at least in part on the read tag data.

* * * * *